United States Patent [19]
Greenberg

[11] Patent Number: 4,796,815
[45] Date of Patent: Jan. 10, 1989

[54] VARIABLE-SPRAY SHOWER HEAD

[76] Inventor: Ilan Greenberg, Geula St. 15, Haifa, Israel

[21] Appl. No.: 174,559

[22] Filed: Mar. 29, 1988

[30] Foreign Application Priority Data

Apr. 3, 1987 [IL] Israel .......................................... 82096

[51] Int. Cl.⁴ ............................ B05B 1/34; B05B 3/04
[52] U.S. Cl. ........................................ 239/477; 239/381
[58] Field of Search ............... 239/461, 463, 468, 469, 239/471, 477, 490–497, 482, 483, 381, 581.1, 581.2, 582.1

[56] References Cited

U.S. PATENT DOCUMENTS

| | | | |
|---|---|---|---|
| 3,004,719 | 10/1961 | Pauppirt, Jr. ................... | 239/463 |
| 4,478,367 | 10/1984 | Petursson ......................... | 239/381 |

FOREIGN PATENT DOCUMENTS

| | | | |
|---|---|---|---|
| 60924 | 2/1955 | France ............................... | 239/494 |
| 269540 | 11/1929 | Italy ................................... | 239/468 |
| 82108 | 7/1953 | Norway ............................. | 239/497 |
| 187339 | 10/1922 | United Kingdom ................ | 239/497 |

Primary Examiner—Andres Kashnikow
Assistant Examiner—Karen B. Merritt
Attorney, Agent, or Firm—Benjamin J. Barish

[57] ABSTRACT

A variable-spray shower head comprises an internal chamber formed with a circular cavity and a discharge nozzle centrally of the circular cavity. The shower head further includes a plurality of flow passageways from its inlet to the circular cavity along different paths with respect to the tangent to the circular cavity; and a manual selector for selectively directing the water to flow from the inlet to the circular cavity via a selected one of the flow passageways to produce a different spray pattern according to the passageway or passageways selected.

20 Claims, 2 Drawing Sheets

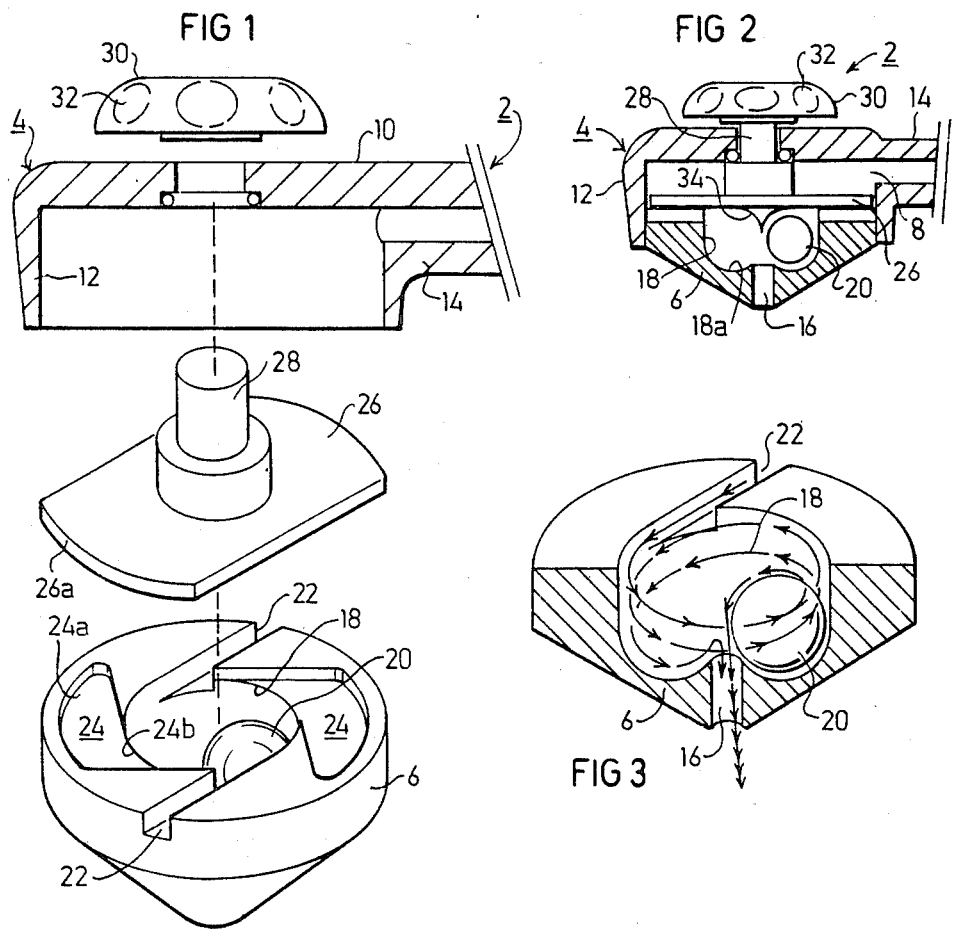
FIG 1
FIG 2
FIG 3
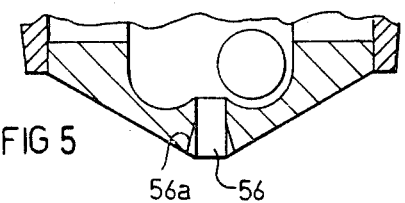
FIG 5
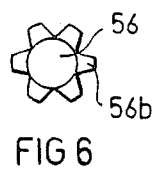
FIG 6

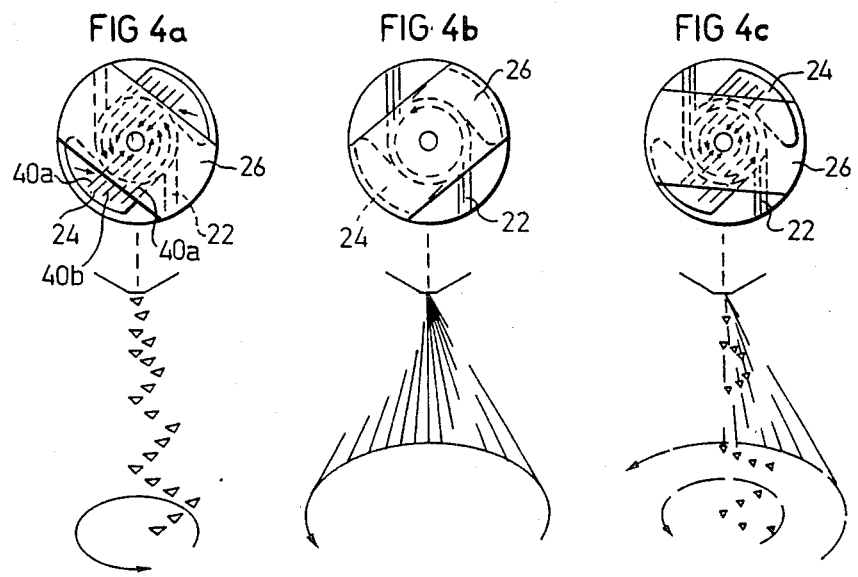
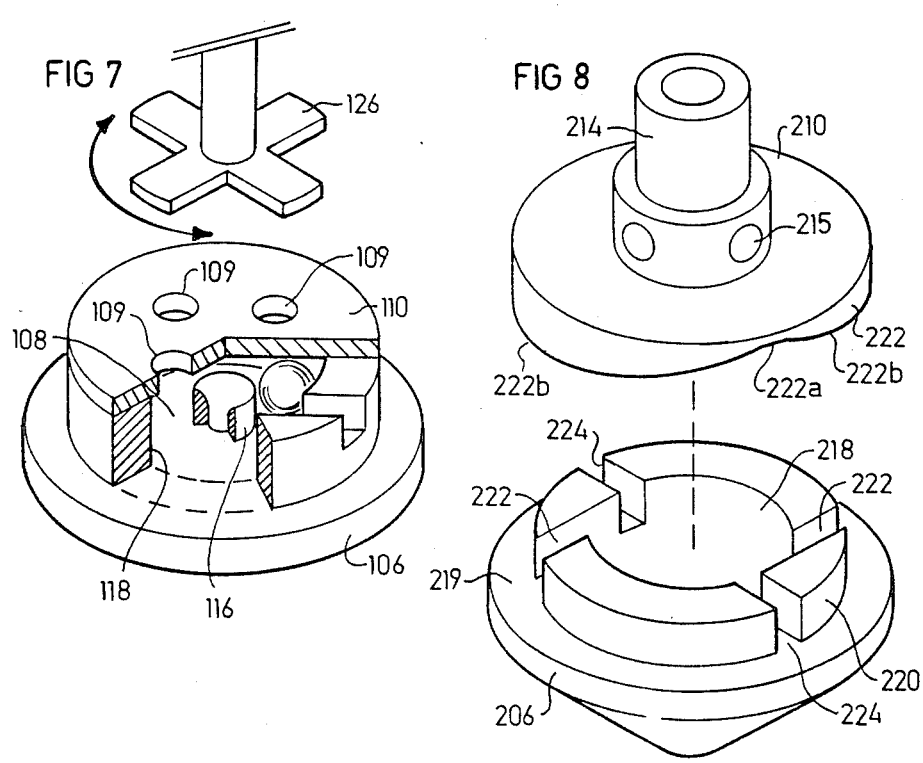

VARIABLE-SPRAY SHOWER HEAD

BACKGROUND OF THE INVENTION

The present invention relates to shower heads, and particularly to a variable-spray shower head which can be preset to select a particular spray pattern.

Many variable-spray shower heads have been designed and are now in use. Generally speaking, however, the known variable-spray shower heads usually contain a screen or an array of small-diameter nozzles which are easily clogged. Such shower heads are therefore of relatively complicated construction and expensive to produce and to maintain.

An object of the present invention is to provide a variable-spray shower head of very simple construction enabling the use of a relatively large diameter nozzle not easily cloggable, and involving relatively few parts which can be produced and assembled in volume and at low cost. Another object of the invention is to provide a shower head which is capable of producing a large number of different spray patterns.

BRIEF SUMMARY OF THE INVENTION

According to the present invention, there is provided a variable-spray shower head comprising: a housing including first and second end walls connected together by an annular side wall and defining an internal chamber therebetween; an inlet through one of the walls for connecting the chamber to a source of pressurized water; a circular cavity formed in the first end wall; a discharge nozzle formed through the first end wall centrally of the circular cavity; means defining a plurality of flow passageways from the inlet to the circular cavity along different paths with respect to the tangent to the circular cavity; and a manual selector for selectively directing the water to flow from the inlet to the circular cavity via a selected one of the flow passageways to produce a different spray pattern according to the passageway or passageways selected.

In the preferred embodiments of the invention described below, the shower head further includes a sphere freely movable in the circular cavity.

As will be apparent from the description below, such a shower head can produce a large number of different spray patterns, and requires but a few simple parts which can be manufactured and assembled in volume and at low cost.

BRIEF DESCRIPTION OF THE DRAWINGS

The invention is herein described, by way of example only, with reference to the accompanying drawings, wherein:

FIG. 1 is an exploded view illustrating the main components of one form of variable-spray shower head constructed in accordance with the present invention;

FIG. 2 is a sectional view illustrating the assembled shower head of FIG. 1;

FIG. 3 is a fragmentary view helpful in understanding the operation of the shower head of FIGS. 1 and 2;

FIGS. 4a–4c illustrate three preselected positions of the shower head of FIGS. 1 and 2 and the spray pattern produced by each position;

FIGS. 5 and 6 are fragmentary sectional end views, respectively, illustrating a modification in the construction of the discharge nozzle; and FIGS. 7 and 8 are exploded fragmentary views illustrating two further variable-spray shower heads constructed in accordance with the present invention.

DESCRIPTION OF PREFERRED EMBODIMENTS

The shower head illustrated in FIGS. 1 and 2 of the drawings comprises a housing, generally designated 2, constituted of a main body section 4 and a removable cover 6 serving as one end wall of an internal chamber 8. The opposite end wall and the side wall of chamber 8 are defined by the end wall 10 and the cylindrical side wall 12, respectively, of body section 4.

Body section 4 is further formed with a tubular extension 14 serving as the water inlet into chamber 8. The water outlet from chamber 8 is via a discharge nozzle 16 formed centrally through cover 6. Cover 6 is further formed with a circular cavity 18 circumscribing the discharge nozzle 16. A sphere 20 is disposed within circular cavity 18.

As shown particularly in FIG. 1, the inner face of cover 6 is further formed with a first pair of slots 22 on opposite sides of the cover leading into the circular cavity 18, and a second pair of slots 24 between slots 22 and also leading into the circular cavity 18. Slots 22 are of generally rectangular configuration and start from the outer edge of the cover and extend generally tangentially to the circular cavity 18. Slots 24, however, include an outer curved section 24a, and an inner radial section 24b. As shown particularly in FIGS. 4a–4c, each of the outer curved sections 24a of slots 24 starts inwardly of the outer edge of the cover 6 and extends across one side of the circular cavity 18, whereas the inner sections 24b of slots 24 extend to the circular cavity from approximately the center of the cavity to one side of its outer circumference.

Disposed within chamber 8 is a member 26 which is of generally rectangular configuration, having a width slightly larger than the diameter of circular cavity 18, and a length equal to the diameter of cover 6. The outer edge 26a of member 26 is rounded to conform to the curvature of the inner face of wall 12. Member 26 engages the inner face of cover 6 and is presettable thereon to any one of several positions with respect to slots 22 and 24, as shown in FIGS. 4a–4c.

Member 26 serves as a selector member for selecting different spray patterns according to its position with respect to slots 22 and 24; this is described more particularly below with respect to FIGS. 4a–4c. As shown particularly in FIG. 2, the selector member 26 is disposed between the inner face of cover 6 and the inlet 14 to the shower head. Thus, the water entering chamber 8 via inlet 14 is influenced by the position of selector member 26 as to the path it takes to the slots 22, 24 into the circular cavity 18, before exiting therefrom through the discharge nozzle 16.

To preselect the position of selector member 26, it is provided with a stem 28 passing through an opening in wall 10 of housing section 4. The outer end of the stem is provided with a knob 30 manually rotatable by the user to position the selector member 26 within chamber 8. Knob 30 may be provided with indicia 32 indicating the different positions of the knob and selector member.

Sphere 20 is freely movable within circular cavity 18 during the operation of the shower head. It has a diameter approximately equal to the radius of the circular cavity 18 minus one-half the radius of the discharge nozzle 16. During its movements in cavity 18, sphere 20 passes into and out of alignment with the slots 22, 24 and thereby influences the flow of water from the inlet to the discharge nozzle, as shown particularly in FIG. 3. In order to constrain the motion of sphere 20 to this circular orbit and to prevent it from blocking the discharge nozzle 16, the bottom of circular cavity 18 is formed with an annular groove 18a (FIG. 2) having a radius of curvature approximately equal to that of sphere 20; in addition, the lower face of selector member 26 is formed with a conical boss 34 centrally thereof also having a curvature approximately equal to the radius of curvature of the sphere.

The mode of operation of the shower head illustrated in FIGS. 1 and 2 wil now be described particularly with reference to FIGS. 4a-4c illustrating three positions of the selector member 26.

In the FIG. 4a position of the selector member, it completely covers both of the tangential slots 22 formed in the upper face of cover 6, and covers only the inner section 24b of the curved slots 24, leaving the outer section 24a of the latter slots exposed to the water entering chamber 8 via inlet 14. Thus, in this position of the selector member 26, all the water entering chamber 8 from inlet 14 will be constrained to flow through the inner sections 24b of slots 24 in the direction of the arrows as illustrated in FIG. 4a. That is, at one side of the circular cavity 18, the water will enter one-half the cavity from its center to one end of its outer circumference; and at the other side, the water will enter the other half of the cavity from the center to the opposite end of its outer circumference. Thus, the outer edges of the entering water will be substantially tangential to the cavity as shown at 40a, whereas the inner edges of the entering water will be substantially radial to the cavity as shown at 40b.

Sphere 20, freely rollable within cavity 18, will be driven according to the direction of the water entering and flowing through the cavity. The water entering the circular cavity 18 tangentially to the cavity tends to move the ball rapidly around the cavity; whereas the water entering the cavity radially tends to retard the movement of the ball around the cavity. Accordingly, in the FIG. 4a position of selector member 26, sphere 20 is moved non-uniformly and relatively slowly around the circular cavity 18. The result is that the water discharged from the shower head via discharge nozzle 16 is in the form of relatively large drops, rotating slowly around the axis of the discharge nozzle 16, as diagrammatically shown in FIG. 4a.

In the position of selector member 26 illustrated in FIG. 4b, the selector member substantially covers the complete surface of the curved slots 24 but leaves exposed the tangential slots 22. Accordingly, all the water entering chamber 8 via inlet 14 is directed to flow tangentially of the circular cavity 18, producing a rapidly-rotating vortex which drives sphere 20 rapidly around the circular cavity. The rapidly rotating sphere 20 causes, by centrifugal and other forces, the water to spread out, whereby the water leaving the discharge nozzle 16 is in the form of a hollow cone of relatively small water droplets as diagrammatically shown in FIG. 4b.

FIG. 4c illustrates an intermediate position of selector member 26, wherein it exposes the tangential slots 22 and part of the circular slots 24. In this case, the sphere 20 is subjected to the combined forces described above with respect to FIGS. 4a and 4b, thereby producing a non-uniform motion, and a non-uniform output including both large and small drops.

It will also be seen that knob 30 may be manually rotated by the user to any intermediate position between the positions of FIGS. 4a, 4b and 4c in order to preset the selector member 26 to selected intermediate positions with respect to slots 22 and 24, and thereby to obtain a wide variety of spray patterns from the discharge nozzle 16.

FIGS. 5 and 6 illustrate a variation in the construction of the discharge nozzle, therein indicated at 56. The nozzle is constructed of a cylindrical bore 56a but the outer face of the bore is formed with an annular array of recesses 56b, which thereby flare-out the outputted spray.

FIG. 7 illustrates a variation of the construction in the shower head. In this variation, the inlet into the internal chamber 108 is via four openings 109 formed through the top wall 110 of housing 102. In addition, the selector member 126 is in the configuration of a cross, including four legs 126, each cooperable with one of the openings 109. The water from chamber 108 is outletted via the discharge nozzle 116. The structure and operation of the shower head illustrated in FIG. 7 is otherwise the same as described above with respect to FIGS. 1-4c.

FIG. 8 illustrates further variations in the construction of the shower head. Thus, the cover 206 forming one end wall of the circular cavity 218 is further formed with a circular rim 219 outwardly of a circular wall 220 in which are formed the slots 222 and 224 leading into the circular cavity. In addition, slots 222 are tangential, whereas slots 224 are radial. Further, the upper housing section 210 is integral with the selector member 222 controlling the spray pattern to be produced, the selector member 222 being in the form of a skirt depending below the end wall 210 and having an outer edge receivable within the annular margin 219 of cover 206. The lower edge of selector member 222 is specially configured so as to define a low portion 222a on each of its two opposite sides permitting water to pass therethrough to the slots 222, 224, and a high portion 222b on each of its two opposite sides blocking the passage of water to the slots. In addition, the water is introduced into the circular cavity 218 via an inlet sleeve 214 having a plurality of radial openings 215.

It will thus be seen that when the shower head illustrated in FIG. 8 is connected to a source of pressurized water, the water passes through inlet sleeve 214 and out through openings 215 to the outer face of selector member 222 and then through the low portions 222a at the opposite sides of the selector member, and through the slots, 222 or 224, with which the low portions 222a of selector member 222 are aligned. Thus, if the low portions 222a are aligned with the tangential slots 222, the water will enter the circular cavity 18 in the tangential direction to produce a relatively uniform hollow-cone output of small droplets, as described above with respect to FIG. 4b; whereas if selector member 222 is located so that its low portions 222a are aligned with the radial slots 224, the water will enter the circular cavity in a radial direction, thereby producing a non-uniform spray pattern of larger droplets similar to that produced in the FIG. 4a arrangement.

While the invention has been described with respect to several preferred embodiments, it will be appreciated that many other variations may be made. For example, sphere 20 may be omitted. In addition, the discharge nozzle may be of other configurations. Further, other constructions may be used for defining the plurality off low passageways from the inlet to the circular cavity along different paths with respect to the tangent to the circular cavity, and other selector members may be used for directing the water to flow through the selected path or paths.

Many other variations, modifications and applications of the invention will be apparent.

What is claimed is:

1. A variable-spray shower head, comprising: a housing including first and second end walls connected together by an annular side wall and defining an internal chamber therebetween; an inlet through one of said walls for connecting said chamber to a source of pressurized water; a circular cavity formed in said first end wall; a discharge nozzle formed through said first end wall centrally of said circular cavity; means defining a plurality of flow passageways from said inlet to said circular cavity along different paths with respect to the tangent to said circular cavity; and a manual selector for selectively directing the water to flow from said inlet to said circular cavity via a selected one of said flow passageways to produce a different spray pattern according to the passageway or passageways selected.

2. The shower head according to claim 1, further including a sphere freely movable in said circular cavity.

3. The shower head according to claim 2, wherein said discharge nozzle is of circular cross-section.

4. The shower head according to claim 3, wherein said sphere has a diameter approximately equal to the radius of the circular cavity minus the radius of said discharge nozzle.

5. The shower head according to claim 2, wherein the outer face of said discharge nozzle is formed with a circular array of recesses.

6. The shower head according to claim 2, wherein said means defining said plurality of flow passageways from said inlet to said circular cavity comprises a plurality of slots formed in the inner face of said first end wall and extending to said discharge nozzle.

7. The shower head according to claim 6, wherein said manual selector comprises a selector member movable over said inner face of said first end wall to cover all or portions of some of said slots, and thereby to expose all or portions of other slots to define the selected flow passageways from said inlet to said circular cavity.

8. The shower head according to claim 7, wherein said manual selector further comprises a knob connected to said selector member and extending through said second end wall of the housing.

9. The shower head according to claim 8, wherein said selector member is formed centrally of its inner face with a boss of conical configuration having a curvature corresponding to that of said sphere to restrain the sphere to movements along the other circumference of said circular cavity and to prevent it from blocking said discharge nozzle.

10. The shower head according to claim 9, wherein the inner face of said first end wall is formed with an annular groove circumscribing said discharge nozzle and having a radius of curvature corresponding to that of said sphere.

11. The shower head according to claim 7, wherein said plurality of slots comprise two rectangular slots extending from the outer edge of said first end wall tangentially to said circular cavity on opposite sides thereof, and two further slots formed between said rectangular slots, each of said further slots having an outer section starting inwardly of the outer edge of said first end wall and extending across one side of the circular cavity, and an inner section extending to said circular cavity from approximately its center to one side of its outer circumference.

12. The shower head according to claim 7, wherein said plurality of slots comprise two slots on opposite sides of said circular cavity and extending substantially tangentially thereto, and two further slots between said first-mentioned slots and extending substantially radially to said circular cavity.

13. The shower head according to claim 7, wherein said selector member is a planar member of generally rectangular configuration.

14. The shower head according to claim 7, wherein said selector member is a planar member having the configuration of a cross.

15. The shower head according to claim 7, wherein said selector member is a cup-shaped member having recessses in its side wall facing said first end wall of the housing.

16. The shower head according to claim 7, wherein said inlet is formed through said side wall of the housing between said selector member and said second end wall.

17. The shower head according to claim 7, wherein said inlet is formed through said second end wall.

18. The shower head according to claim 7, wherein said inlet is formed through said preselector knob to the outer face of said selector member opposite to that facing said circular cavity.

19. A variable-spray shower head, comprising: a housing including first and second end walls connected together by an annular side wall and defining an internal chamber therebetween; an inlet through one of said walls for connecting said chamber to a source of pressurized water; a circular cavity formed in said first end wall; a discharge nozzle formed through said first end wall centrally of said circular cavity; a plurality of slots formed in the inner face of said first end wall and extending to said discharge nozzle, said plurality of slots defining a plurality of flow passageways from said inlet to said circular cavity along different paths with respect to the tangent to said circular cavity; and a manual selector for selectively directing the water to flow from said inlet to said circular cavity via a selected one of said flow passageways to produce a different spray pattern according to the passageway or passageways selected.

20. The shower head according to claim 19, wherein said manual selector comprises a selector member movable over said inner face of said first end wall to cover all or portions of some of said slots, and thereby to expose all or portions of other slots to define the selected flow passageways from said inlet to said circular cavity.

* * * * *